No. 861,497. PATENTED JULY 30, 1907.
M. BROCK.
INSOLE FOR BOOTS AND SHOES.
APPLICATION FILED JUNE 18, 1900.
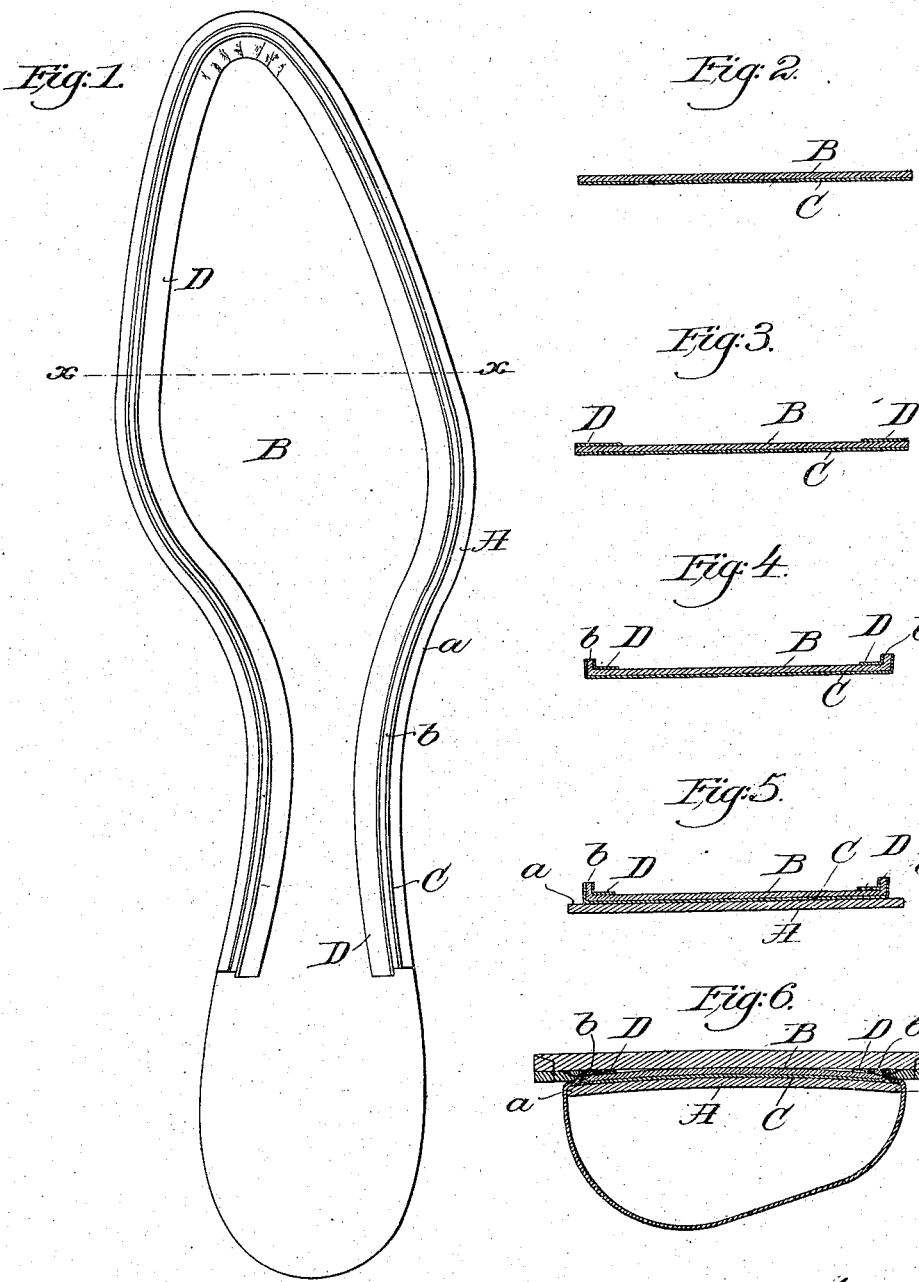

UNITED STATES PATENT OFFICE.

MATTHIAS BROCK, OF BOSTON, MASSACHUSETTS, ASSIGNOR TO UNITED SHOE MACHINERY COMPANY, OF PATERSON, NEW JERSEY, A CORPORATION OF NEW JERSEY.

INSOLE FOR BOOTS AND SHOES.

No. 861,497. Specification of Letters Patent. Patented July 30, 1907.

Application filed June 18, 1900. Serial No. 20,617.

*To all whom it may concern:*

Be it known that I, MATTHIAS BROCK, a citizen of the United States, residing at Boston, in the county of Suffolk and State of Massachusetts, have invented certain new and useful Improvements in Insoles for Boots and Shoes; and I do hereby declare the following to be a full, clear, and exact description of the invention, such as will enable others skilled in the art to which it appertains to make and use the same.

The present invention relates generally to improvements in insoles for boots and shoes, and more particularly to improvements in insoles for welted boots or shoes.

It has been proposed in the prior art to make an insole for welted boots or shoes of two layers of material, stitched together along the shank and forepart by a seam located a uniform distance from the edge, the portion of one of said layers outside the seam being turned up to form the lip, the corresponding portion of the other layer forming the feather.

The above-described form of insole has been found objectionable in that the seam which unites the layers lies along the inner face of the sole and next the foot of the wearer, and for the further reason that unless the layer which is turned up to form the lip is of substantial thickness, the lip is not strong enough to hold the inseam.

The object of the present invention is to remedy the above objections and generally to improve insoles of the type hereinbefore referred to, and to that end it consists of an improved insole embodying the novel features hereinafter described and claimed.

The accompanying drawings illustrate the preferred form of the present invention in which;

Figure 1 is a plan view of the finished sole, Figs. 2, 3, 4 and 5 are sectional views illustrating the several steps in the preferred method of assembling the sole, and Fig. 6 is a sectional view of a welted shoe with my improved insole, the section of the insole corresponding to a section on line x—x Fig. 1.

In the drawings A represents the inner layer or body portion of the insole, which may be of leather, leather board or other suitable material, and B represents the outer layer which also may be of leather or other suitable material. The layers A and B, as preferably constructed, comprise heel portions corresponding substantially in shape and size, and along the shank and forepart that portion of the layer B immediately adjacent to its edge is turned up to form the lip b, the edge portion of the layer A projecting beyond the base of the lip b and forming the feather a. The layer B may be and preferably is of much thinner stock than the layer A, and to make the lip b of sufficient strength to receive the inseam, I provide between the layers A and B a reinforcing covering C of canvas or other suitable material, which preferably extends across the inner face of layer B and covers the outer side of the lip b. In this connection I desire to state that while it is essential that the covering C should extend between the layers A and B a sufficient distance to provide for its being firmly secured in position it is not essential to my invention in its broadest form that the covering C should extend clear across the face of layer B, and it may be omitted from the central portion without a material departure therefrom. The reinforcing covering C in my preferred construction is cemented to both of the layers A and B and said layers are thereby more securely held together than if merely cemented together without such intervening material, said material serving to hold the cement and forming a strong bond between said layers. In the preferred form of my invention, I also provide a reinforcing strip D which covers the inner side of the lip b and extends from the base of the lip b along the face of the layer B a sufficient distance to enable it to be firmly secured thereto. The strip D may be an independent strip or may be formed by folding the covering C over the edge of layer B and securing the folded-over portion to the upper surface of said layer.

In making the insole, the covering C and the strip D are preferably applied to the layer B before the lip b is turned up (see Figs. 2 and 3), they may however be applied afterwards.

Having thus described my improved insole and the method of making it, I claim as new and desire to secure by Letters Patent of the United States.

1. An insole comprising two layers of firm material of which the margins form respectively the lip and the feather, and an intermediate layer of relatively pliable material coextensive with the lip-forming layer and secured to the lip, substantially as described.

2. An insole comprising two layers of firm material, of which the margins form respectively the lip and the feather, and an intermediate layer of relatively pliable material cemented to the opposed surfaces of the outer layers and to the outer side of the lip, substantially as described.

3. An insole comprising two layers of leather of which the margins form respectively the lip and the feather, and an intermediate layer of textile material secured to the other layers and to the lip, substantially as described.

4. An insole comprising two layers of leather, leather board or the like, of which the margins form respectively the lip and the feather, and an intermediate layer of textile material cemented to the outer layers and forming a uniting bond therefor, substantially as described.

5. An insole comprising alternate layers of firm and relatively pliable material secured together by cement of which the margins form, respectively, the feather, a reinforcement for the outer side of the lip, the lip, and a reinforcement for the inner side thereof, substantially as described.

6. An insole comprising two layers of leather of which the margins form respectively the lip and the feather, the lip forming layer being thinner than the feather forming layer and being reinforced at its marginal portion by a layer of textile material cemented thereto and secured to the lip and between the layers of leather by cement, substantially as described.

7. An insole comprising two layers of leather of which the margins form respectively the lip and the feather and a layer of textile material for reinforcing the lip secured thereto and secured between the adjacent faces of the leather layers, substantially as described.

In testimony whereof I affix my signature, in presence of two witnesses.

MATTHIAS BROCK.

Witnesses:
 HORACE VAN EVEREN,
 ALFRED H. HILDRETH.